US010097481B2

(12) United States Patent
Narayanaswamy et al.

(10) Patent No.: US 10,097,481 B2
(45) Date of Patent: Oct. 9, 2018

(54) METHODS AND APPARATUS FOR PROVIDING SERVICES IN DISTRIBUTED SWITCH

(75) Inventors: Krishna Narayanaswamy, Saratoga, CA (US); Jean-Marc Frailong, Los Altos Hills, CA (US); Anjan Venkatramani, Los Altos, CA (US); Srinivasan Jagannadhan, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 13/538,344

(22) Filed: Jun. 29, 2012

(65) Prior Publication Data

US 2014/0003433 A1 Jan. 2, 2014

(51) Int. Cl.
*H04L 12/28* (2006.01)
*H04L 12/931* (2013.01)
*H04L 29/08* (2006.01)

(52) U.S. Cl.
CPC .......... *H04L 49/355* (2013.01); *H04L 67/327* (2013.01)

(58) Field of Classification Search
None
See application file for complete search history.

(56) References Cited

U.S. PATENT DOCUMENTS

| | | | |
|---|---|---|---|
| 6,097,698 A | 8/2000 | Yang et al. | |
| 7,167,924 B1 | 1/2007 | Symonds et al. | |
| 7,738,469 B1 | 6/2010 | Shekokar et al. | |
| 7,764,611 B2 | 7/2010 | Rijhsinghani et al. | |
| 7,891,001 B1 * | 2/2011 | Greenawalt | H04L 63/20 713/151 |
| 8,094,575 B1 * | 1/2012 | Vadlakonda et al. | 370/252 |

(Continued)

FOREIGN PATENT DOCUMENTS

| | | |
|---|---|---|
| EP | 1506494 A1 | 2/2005 |
| WO | 03096214 A1 | 11/2003 |

OTHER PUBLICATIONS

European Search Report dated Oct. 28, 2013 for European Patent Application No. 13165633.2.

(Continued)

*Primary Examiner* — Ayaz Sheikh
*Assistant Examiner* — Sori Aga
(74) *Attorney, Agent, or Firm* — Cooley LLP

(57) ABSTRACT

In some embodiments, a non-transitory processor-readable medium stores code representing instructions to be executed by a processor. The code causes the processor to receive, from a source peripheral processing device, a portion of a data packet having a destination address associated with a destination peripheral processing device. The code causes the processor to identify, based on the destination address, a service to be performed on the portion of the data packet. The code causes the processor to select, based on the service, an identifier of a service module associated with the service. The code further causes the processor to send the portion of the data packet to the service module via a distributed switch fabric such that the service module performs the service on the portion of the data packet and sends the portion of the data packet to the destination peripheral processing device via the distributed switch fabric.

13 Claims, 6 Drawing Sheets

(56) References Cited

U.S. PATENT DOCUMENTS

| | | | |
|---|---|---|---|
| 8,762,534 | B1 | 6/2014 | Hong |
| 8,914,878 | B2 | 12/2014 | Bums |
| 2003/0002494 | A1 | 1/2003 | Kuukankorpi et al. |
| 2003/0163737 | A1 | 8/2003 | Roskind |
| 2003/0212776 | A1 | 11/2003 | Roberts et al. |
| 2006/0039364 | A1* | 2/2006 | Wright .......................... 370/352 |
| 2007/0083625 | A1 | 4/2007 | Chamdani et al. |
| 2007/0180226 | A1 | 8/2007 | Schory et al. |
| 2007/0180513 | A1 | 8/2007 | Raz et al. |
| 2009/0037445 | A1 | 2/2009 | Ushiyama |
| 2010/0158003 | A1* | 6/2010 | Rijhsinghani et al. ....... 370/392 |
| 2010/0180334 | A1 | 7/2010 | Chen et al. |
| 2011/0010481 | A1* | 1/2011 | Hamadani et al. ........... 710/313 |
| 2011/0096781 | A1* | 4/2011 | Aybay ........................... 370/392 |
| 2012/0042006 | A1 | 2/2012 | Kiley et al. |
| 2012/0297491 | A1 | 11/2012 | Schory et al. |
| 2012/0331146 | A1 | 12/2012 | Hsu et al. |
| 2013/0230047 | A1 | 9/2013 | Subrahmaniam et al. |
| 2013/0308645 | A1 | 11/2013 | Karino |
| 2014/0003232 | A1 | 1/2014 | Guichard et al. |
| 2014/0016648 | A1 | 1/2014 | Hidaka |
| 2014/0019639 | A1 | 1/2014 | Ueno |
| 2014/0108600 | A1 | 4/2014 | Cabillic |

OTHER PUBLICATIONS

European Search Report dated Oct. 28, 2013 for European Patent Application No. 13165566.4.
Office Action dated Sep. 11, 2014 for U.S. Appl. No. 13/538,328.
Office Action dated Mar. 25, 2015 for U.S. Appl. No. 13/538,328.
Office Action for U.S. Appl. No. 13/538,328, dated Nov. 4, 2015.
Office Action received for Chinese Application No. 2013101597091, dated Dec. 7, 2015.
Search Report for Chinese Application No. 2013101596347, dated Dec. 11, 2015.
First Office Action received for Chinese Application No. 2013101596347, dated Jan. 14, 2016.
Office Action for European Application No. 131655664, dated Apr. 29, 2016.
Search Report for Chinese Application No. 2013101596347, dated Jul. 5, 2016.
Office Action for Chinese Application No. 2013101597091, dated Jul. 19, 2016.
Second Office Action for Chinese Patent Application No. 201310159634.7 dated Sep. 28, 2016.
Search Report for Chinese Patent Application No. 201310159634.7 dated Jun. 20, 2016 (Translation Unavailable).
Final Rejection for U.S. Appl. No. 13/538,328, dated Dec. 29, 2016.
Examination Report, dated Oct. 20, 2017, for EP Application No. 13165566.4. (7 pages).
Search Report, dated Nov. 25, 2015, for Chinese Patent Application No. 201310159709.1. (2 pages).
Search Report, dated Jul. 5, 2016, for Chinese Patent Application No. 201310159709.1. (2 pages).
Third Office Action, dated Dec. 28, 2016, for Chinese Application No. 201310159709.1. (10 pages).
Fourth Office Action, dated Jul. 5, 2017, for Chinese Application No. 201310159709.1. (14 pages).
Fourth Office Action for Chinese Application No. 201310159709.1, dated Jul. 5, 2017.

* cited by examiner

METHODS AND APPARATUS FOR PROVIDING SERVICES IN DISTRIBUTED SWITCH

CROSS-REFERENCE TO RELATED APPLICATION

This application is related to co-pending U.S. patent application Ser. No. 13/538,328, filed on the same date, and entitled "Methods and Apparatus for Providing Services in a Distributed Switch," which is incorporated herein by reference in its entirety.

BACKGROUND

Some embodiments described herein relate generally to large data centers and enterprise networks, and, in particular, to methods and apparatus for providing services in a distributed switch within, for example, a single-layer data center.

Some known data centers arrange network devices in a way such that a typical three-layer architecture (e.g., an access layer, an aggregation layer and a core layer) can be collapsed into a single-layer architecture. In such single-layer architecture, multiple edge devices such as top-of-rack (TOR) network devices are interconnected by multiple links. The TOR network devices are connected to multiple server devices that provide various functions and services for components of the data center.

A need exists, however, for methods and apparatus that can efficiently provide the functions and services in data centers of the single-layer architecture.

SUMMARY

In some embodiments, a non-transitory processor-readable medium stores code to cause a processor to receive, from a source peripheral processing device, a portion of a data packet having a destination address associated with a destination peripheral processing device. The code causes the processor to identify, based on at least in part on the destination address, a service to be performed on the portion of the data packet. The code causes the processor to select, based on the service, an identifier associated with a service module associated with the service. The code further causes the processor to send the portion of the data packet to the service module via a distributed switch fabric such that the service module performs the service on the portion of the data packet and sends the portion of the data packet to the destination peripheral processing device via the distributed switch fabric.

DETAILED DESCRIPTION

Figure 1:
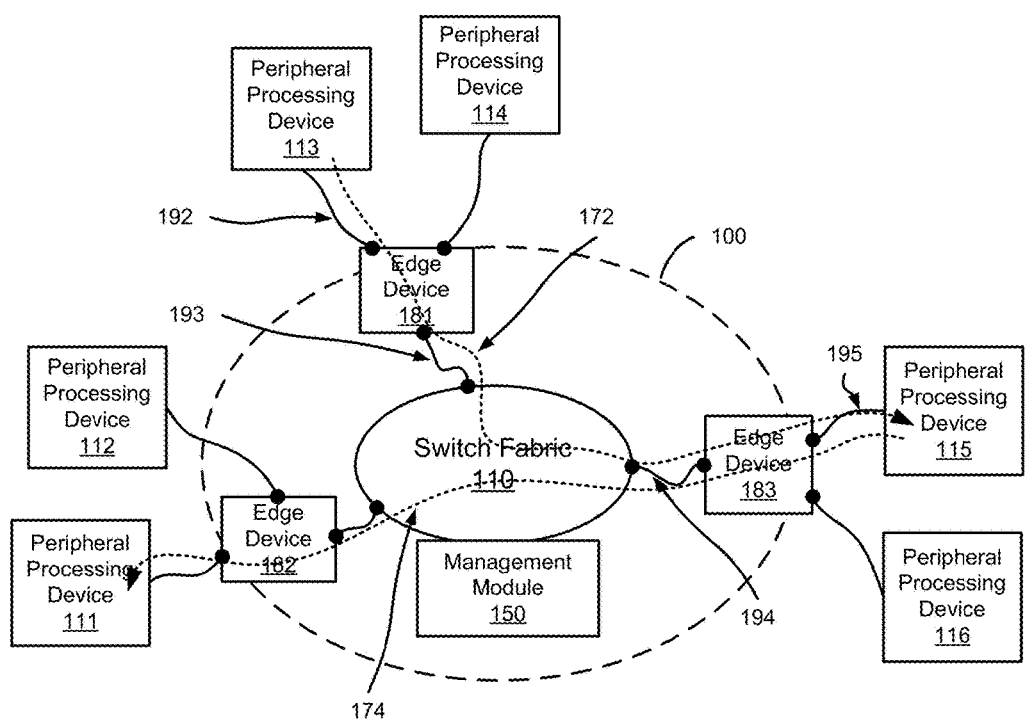
FIG. 1 is a schematic illustration of a switch fabric system configured to provide services to data traffic, according to an embodiment.

In some embodiments, a non-transitory processor-readable medium stores code representing instructions to be executed by a processor. The code stored in the non-transitory processor-readable medium includes code to cause the processor to receive, from a source peripheral processing device, at least a portion of a data packet (e.g., a data cell, a data unit, the entire data packet, a header portion of the data packet, a payload portion of the data packet, etc.) having a destination address associated with a destination peripheral processing device. The non-transitory processor-readable medium includes code to cause the processor to identify a first service to be performed on the portion of the data packet based on, for example, the destination address. In some embodiments, such a first service can be, for example, a security service, a load balancing service, or the like.

The non-transitory processor-readable medium also includes code to cause the processor to select, based on the first service, an identifier associated with a first service module associated with the first service. In some embodiments, the code causes the processor to select the identifier based on a result of a hash function having the destination address as an input to the hash function. In some embodiments, the first service module is within an edge device or a service peripheral processing device that is different from the source peripheral processing device and the destination peripheral processing device.

The non-transitory processor-readable medium further includes code to cause the processor to send the portion of the data packet (e.g., a data cell, a data unit, the entire data packet, a header portion of the data packet, a payload portion of the data packet, etc.) to the first service module via a distributed switch fabric such that the first service module performs the first service on the portion of the data packet and sends the portion of the data packet to the destination peripheral processing device via the distributed switch fabric. In some embodiments, the distributed switch fabric includes a Clos architecture.

In some embodiments, the non-transitory processor-readable medium includes code to cause the processor to identify a second service to be performed on the portion of the data packet (e.g., a data cell, a data unit, the entire data packet, a header portion of the data packet, a payload portion of the data packet, etc.). The code causes the processor to select, based on the second service, an identifier associated with a second service module associated with the second service. The code further causes the processor to send the portion of the data packet to the first service module via the distributed switch fabric such that the first service module performs the first service on the portion of the data packet and sends the portion of the data packet to the destination peripheral processing device via the distributed switch fabric and the second service module.

As used herein, the term "physical hop" can include a physical link between two modules and/or devices. For example, a data path operatively coupling a peripheral processing device with an edge device can be said to be a physical hop. Similarly stated, a physical hop can physically link the peripheral processing device with the edge device.

As used herein, the term "single physical hop" can include a direct physical connection between two devices in a system. Similarly stated, a single physical hop can include a link via which two devices are coupled without any intermediate module. Accordingly, for example, if a peripheral processing device is coupled to an edge device via a single physical hop, the peripheral processing device can send data packets directly to the edge device without sending the data packets through any intervening module.

As used herein, the term "single logical hop" means a physical hop and/or group of physical hops that are a single hop within a network topology associated with a first protocol. Similarly stated, according to the topology associated with the first protocol, no intervening nodes exist between a first module and/or device operatively coupled to a second module and/or device via the physical hop and/or the group of physical hops. A first module and/or device connected to a second module and/or device via a single logical hop can send a data packet to the second module and/or device using a destination address associated with the first protocol and the second module and/or device, regardless of the number of physical hops between the first device and the second device. In some embodiments, for example, a second protocol can use the destination address of the first protocol to route a data packet and/or cell from the first module and/or device to the second module and/or device over the single logical hop. Similarly stated, when a first module and/or device sends data to a second module and/or device via a single logical hop of a first protocol, the first module and/or device treats the single logical hop as if it is sending the data directly to the second module and/or device.

In some embodiments, a switch fabric (e.g., a distributed switch fabric) can function as part of a single logical hop (e.g., a single large-scale consolidated L2/L3 switch). For example, portions of the switch fabric can be physically distributed across, for example, many chassis and/or modules interconnected by multiple physical hops. Such a switch fabric can be referred to as a distributed switch fabric. In some embodiments, for example, a stage of the distributed switch fabric can be included in a first chassis and another stage of the distributed switch fabric can be included in a second chassis. Both of the stages can logically function as part of a single consolidated switch (e.g., within the same logical hop according to a first protocol) but include a separate single physical hop between respective pairs of stages within the consolidated switch. Similarly stated, a physical hop can operatively couple each stage within a distributed switch fabric representing a single logical hop associated with a protocol used to route data outside the distributed switch fabric. Additionally, packet classification and forwarding associated with a protocol used to route data outside a single logical hop need not occur at each stage within the single logical hop. In some embodiments, for example, packet classification and forwarding associated with a first protocol (e.g., Ethernet) can occur prior to a module and/or device sending the data packet to another module and/or device via the single logical hop.

As used in this specification, the singular forms "a," "an" and "the" include plural referents unless the context clearly dictates otherwise. Thus, for example, the term "a service module" is intended to mean a single service module or a combination of service modules.

FIG. 1 is a schematic illustration of a switch fabric system 100 configured to provide services to data traffic, according to an embodiment. The switch fabric system 100 includes a switch fabric 110, a management module 150 and multiple edge devices (e.g., edge devices 181-183). The switch fabric system 100 operatively couples multiple peripheral processing devices (e.g., peripheral processing devices 111-116) to each other. As shown in FIG. 1, each peripheral processing device 111-116 is operatively coupled to an edge device 181-183 of the switch fabric system 100. Specifically, the peripheral processing devices 111 and 112 are operatively coupled to the edge device 182; the peripheral processing devices 113 and 114 are operatively coupled to the edge device 181; the peripheral processing devices 115 and 116 are operatively coupled to the edge device 183.

Each peripheral processing device 111-116 can be any device that can send data to and/or receive data from the edge device 181-183 that is operatively coupled to that peripheral processing device 111-116. The peripheral processing devices 111-116 can be, for example, compute nodes, service nodes, routers, and storage nodes, etc. In some embodiments, for example, the peripheral processing devices 111-116 include servers, storage devices, gateways, workstations, and/or the like.

The peripheral processing devices 111-116 can be operatively coupled to the edge devices 181-183 of the switch fabric system 100 using any suitable connection such as, for example, an optical connection (e.g., an optical cable and optical connectors), an electrical connection (e.g., an electrical cable and electrical connectors), a wireless connection (e.g., a wireless transceiver), and/or the like. As such, the peripheral processing devices 111-116 can be configured to send data (e.g., data packets, data cells) to other peripheral processing devices 111-116 via the switch fabric system 100 including the edge devices 181-183 and the switch fabric 110. In some embodiments, the connection between the peripheral processing devices 111-116 and the edge devices 181-183 is a direct link (e.g., a wired link, a wireless link). Such a link can be said to be a single physical hop link. In other embodiments, the peripheral processing devices 111-116 can be operatively coupled to the edge devices 181-183 via intermediate modules (not shown in FIG. 1). Such a connection can be said to be a multiple physical hop link.

Each edge device 181, 182, 183 can be any device configured to operatively couple peripheral processing devices 111-116 to the switch fabric 110. In some embodiments, the edge devices 181-183 can be, for example, access switches, input/output modules, top-of-rack (TOR) devices and/or the like. Structurally, the edge devices 181-183 can function as both source edge devices and destination edge devices. Accordingly, the edge devices 181-183 can send data (e.g., a data stream of data packets or data cells) to and receive data from the switch fabric 110, and to and from the connected peripheral processing devices 111-116.

Each edge device 181, 182, 183 is configured to communicate with the other edge devices 181-183 via the switch fabric 110. Specifically, the switch fabric 110 is configured to provide any-to-any connectivity between the edge devices 181-183 at relatively low latency. That is, the switch fabric 110 can be configured to transmit (e.g., convey) data between the edge devices 181-183. In some embodiments, the switch fabric 110 can have at least hundreds or thousands of ports (e.g., egress ports and/or ingress ports) through which the edge devices 181-183 can transmit and/or receive data. In some embodiments, each edge device 181, 182, 183 can be configured to communicate with the other edge devices 181, 182, 183 over multiple data paths across the switch fabric 110. Similarly stated, in some embodiments, multiple data paths exist, within the switch fabric 110, between an edge device 181, 182 or 183 and another edge device 181, 182 or 183. In some embodiments, the switch fabric system 100 can have a single-layer architecture. In such a single-layer architecture, each edge device is configured to be connected to and communicate with each other edge device via a single physical hop. Similarly stated, each edge device is directly connected to each other edge device in the switch fabric system.

Figure 3:
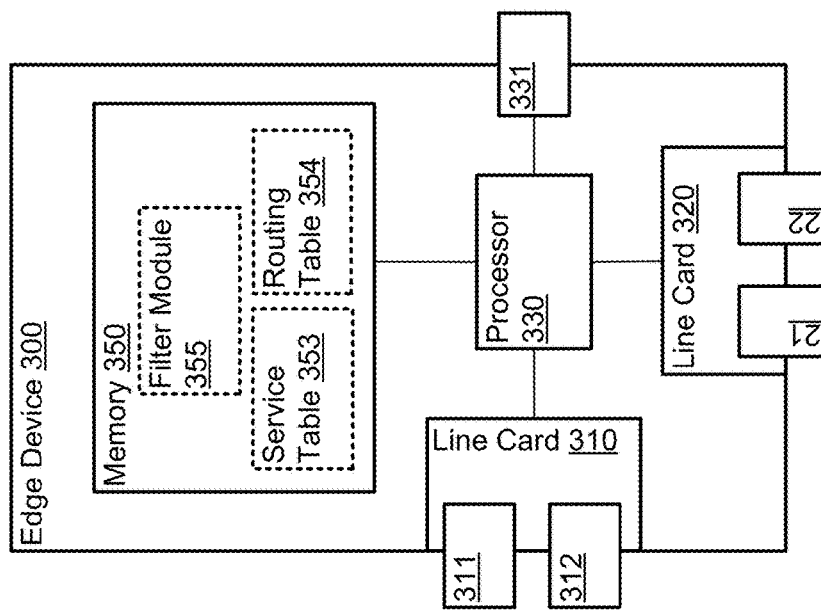
FIG. 3 is a block diagram of an edge device, according to an embodiment.

FIG. 3 is a block diagram of an edge device 300, according to an embodiment. The edge device 300 can be structurally and functionally similar to the edge devices 181-183 shown and described with respect to FIG. 1. Particularly, the edge device 300 can operatively couple one or more peripheral processing devices (similar to the peripheral processing devices 111-116 in FIG. 1, not shown in FIG. 3) to a switch fabric (similar to the switch fabric 110 in FIG. 1, not shown in FIG. 3).

As shown in FIG. 3, the edge device 300 includes a processor 330; a memory 350, which includes a filter module 355, a service table 353 and a routing table 354; line cards 310, 320; and a port 331. The processor 330 is operatively coupled to the memory 350, the line card 310, the line card 320 and the port 331. The line card 310 includes ports 311 and 312. The line card 320 includes ports 321 and 322. In some embodiments, the line cards 310 and/or 320 can include one or more processors and/or memories. In some embodiments, a port can be any entity that can actively communicate with (e.g., send data to and/or receive data from) a coupled device or over a network. Such a port need not necessarily be a hardware port, but can be a virtual port or a port defined by software.

In some embodiments, the ports 311, 312, 321 and/or 322 can be coupled to and communicate with, for example, multiple peripheral processing devices coupled to the edge device 300. In such embodiments, the ports 311, 312, 321 and/or 322 can implement one or more physical layers (e.g., a physical layer using fiber-optic signaling, a physical layer using twisted-pair electrical signaling). Furthermore, the ports 311, 312, 321 and/or 322 can allow the edge device 300 to communicate with the multiple peripheral processing devices via one or more communication protocols (e.g., a Fibre Channel protocol, an Ethernet protocol). Thus, the edge device 300 can be in communication with the multiple peripheral processing devices using homogeneous or heterogeneous physical layers and/or communication protocols via the ports 311, 312, 321 and/or 322.

In some embodiments, the port 331 can be connected to a device (e.g., a switching device, a routing device) within the switch fabric, such that the edge device 300 can be operatively coupled to other edge devices via the switch fabric. The port 331 can be part of one or more network interfaces (e.g., a 40 Gigabit (Gb) Ethernet interface, a 100 Gb Ethernet interface, etc.) through which the edge device 300 can send data to and/or receive data from the switch fabric. The data can be sent to and/or received from the switch fabric via, for example, an optical link, an electrical link, or a wireless link operatively coupled to the edge device 300. In some embodiments, the edge device 300 can send data to and/or receive data from the switch fabric based on one or more communication protocols (e.g., a Fibre Channel protocol, an Ethernet protocol).

In some embodiments, the port 331 can implement a different physical layer and/or communication protocol than those implemented at the ports 311, 312, 321 and 322. For example, the port 311, 312, 321 and 322 can communicate with the peripheral processing devices using a communication protocol based on data packets and the port 331 can communicate with the switch fabric using a communication protocol based on data cells. In some embodiments, the edge device 300 can be an edge device of a network switch such as a distributed network switch.

In some embodiments, the memory 350 can be, for example, a random-access memory (RAM) (e.g., a dynamic RAM, a static RAM), a flash memory, a removable memory, and/or so forth. In some embodiments, the service table 353 and the routing table 354 can be implemented as, for example, a relational database, a table, and/or so forth. In some embodiments, the service table 353 and the routing table 354 can each be stored in one or more locations within the memory 350. In some embodiments, although not shown in FIG. 3, the edge device 300 can include one or more service tables and/or one or more routing tables. In some embodiments, the filter module 355 can be, for example, a process, application, virtual machine, and/or some other software module (stored and/or executing in hardware) or a hardware module. For example, instructions that implement the filter module 355 can be stored within the memory 350 and executed at the processor 330.

In some embodiments, the edge device 300 can include a combination of hardware modules and software modules (stored and/or executing in hardware). In some embodiments, for example, the edge device 300 can include a field-programmable gate array (FPGA), an application specific integrated circuit (ASIC), a digital signal processor (DSP) and/or the like. In some embodiments, by executing the module(s) (e.g., the filter module 355) included in the edge device 300 and using the service table 353 and the routing table 354, the edge device 300 can be configured to route data traffic through the switch fabric such that one or more desired services can be performed on the data before the data is sent to the destination (e.g., a destination peripheral processing device). Specifically, the edge device 300 can be configured to identify one or more services to be performed on the data that is received at the edge device 300, select one or more service modules associated with the identified service(s), and send the data to the selected service module(s) such that the selected service module(s) can perform the service(s) on the data. Details of such a process are further described with respect to FIGS. 1, 6 and 7.

Figure 5:
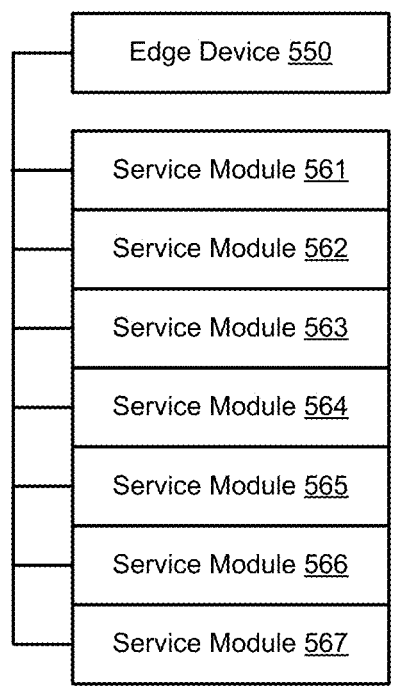
FIG. 5 is a schematic illustration of an edge device operatively coupled to a set of service modules, according to an embodiment.

In some embodiments, an edge device can be operatively coupled to or include one or more service modules. FIG. 5 is a schematic illustration of an edge device 550 operatively coupled to a rack of service modules 561-567, according to an embodiment. The edge device 550 can be structurally and functionally similar to the edge devices 181-183 shown and described with respect to FIG. 1. Particularly, the edge device 550 can be an edge device within a switch fabric system (similar to the switch fabric system 100 in FIG. 1). The edge device 550 can operatively couple a set of peripheral processing devices (similar to the peripheral processing devices 111-116 in FIG. 1, not shown in FIG. 5) to a switch fabric (similar to the switch fabric 110 in FIG. 1, not shown in FIG. 5). In some embodiments, for example, the edge device 550 can be a TOR network device such as a network switch, which is interconnected with the rack of service modules 561-567.

The service modules 561-567 can be any module, component or device configured to provide a function and/or perform a service. For example, each service module 561-567 can be configured to provide a function(s) associated with transmitting data to and/or receiving data from other devices via the edge device 550 and the switch fabric, where the edge device 550 can be a source edge device and/or a destination edge device. For example, the service module 561 can be a web server configured to host a website and receive, via the edge device 550 and the switch fabric, data from an input device (e.g., a personal computer, a smart phone) operated by a user. For another example, the service module 562 can be an application server configured to execute an application and send, via the edge device 550 and the switch fabric, data to a display device associated with a user.

One or more service modules from the rack of service modules 561-567 can be configured to perform a service on data transmitted across the switch fabric. For example, the service module 563 can be configured to perform a security service (e.g., firewall) on data transmitted to a web server. For another example, the service module 564 can be configured to perform a load balancing service (e.g., distribute data traffic over multiple data paths) on data generated from an application server. One or more service modules from the rack of service modules 561-567 can be a virtual service module. Such a virtual service module can be managed (e.g., instantiated, configured, monitored, maintained, moved, de-instantiated, etc.) by a management module (similar to the management module 150 in FIG. 1 and the management module 400 in FIG. 4) that is configured to manage the edge devices (including the edge device 550) and the virtual service module(s) of the switch fabric system. Details of managing virtual service modules are further described with respect to FIG. 4.

One or more service modules 561-567 can be hosted and executed at, for example, a peripheral processing device from the set of peripheral processing devices operatively coupled to the edge device 550, and/or any other type of server device operatively coupled to the edge device 550. In such embodiments, the one or more service modules 561-567 are operatively coupled to the edge device 550 as shown in FIG. 5. A peripheral processing device hosting a service module can be referred to as a service peripheral processing device. Similarly, although not shown in FIG. 5, one or more service modules 561-567 can be hosted and executed within the edge device 550. In such embodiments, the one or more service modules 561-567 can be stored in a memory of the edge device 550 and executed at a processor of the edge device 550. An edge device hosting a service module can be referred to as a service edge device.

Returning to FIG. 1, the switch fabric 110 can be any suitable switch fabric that operatively couples the edge devices 181-183 to the other edge devices 181-183 via one or multiple data paths. For example, the switch fabric 110 can be a Clos network (e.g., a non-blocking Clos network, a strict sense non-blocking Clos network, a Benes network) having multiple stages of switch modules (e.g., integrated Ethernet switches). In some embodiments, for example, the switch fabric 110 can be similar to the switch fabric 200 that has three stages (as shown and described with respect to FIG. 2). In other embodiments, the switch fabric 110 shown in FIG. 1 can include any number of stages. In such embodiments, for example, the switch fabric 110 can include five, seven or nine stages.

In some embodiments, the switch fabric 110 can be (e.g., can function as) a single consolidated switch (e.g., a single large-scale consolidated L2/L3 switch). Similarly stated, the switch fabric 110 can be configured to operate as a single logical entity (e.g., a single logical network element). In such embodiments, the switch fabric 110 can be part of a single logical hop between a first edge device 181, 182 or 183 and a second edge device 181, 182 or 183 (e.g., along with the data paths between the edge devices 181-183 and the switch fabric 110). The switch fabric 110 can be configured to connect (e.g., facilitate communication between) the peripheral processing devices 111-116. In some embodiments, the switch fabric 110 can be configured to communicate via interface devices (not shown in FIG. 1) that are configured to transmit data at a rate of at least 10 Gb/s. In some embodiments, the switch fabric 110 can be configured to communicate via interface devices (e.g., fibre-channel interface devices) that are configured to transmit data at a rate of, for example, 2 Gb/s, 4 Gb/s, 8 Gb/s, 10 Gb/s, 40 Gb/s, 100 Gb/s and/or faster link speeds.

Although the switch fabric 110 can be logically centralized, the implementation of the switch fabric 110 can be highly distributed, for example, for reliability. For example, portions of the switch fabric 110 can be physically distributed across, for example, many chassis (or racks). In some embodiments, for example, a stage of the switch fabric 110 can be included in a first chassis and another stage of the switch fabric 110 can be included in a second chassis. Both of the stages can logically function as part of a single consolidated switch (e.g., within the same logical hop) but have a separate single physical hop between respective pairs of stages.

Figure 2:
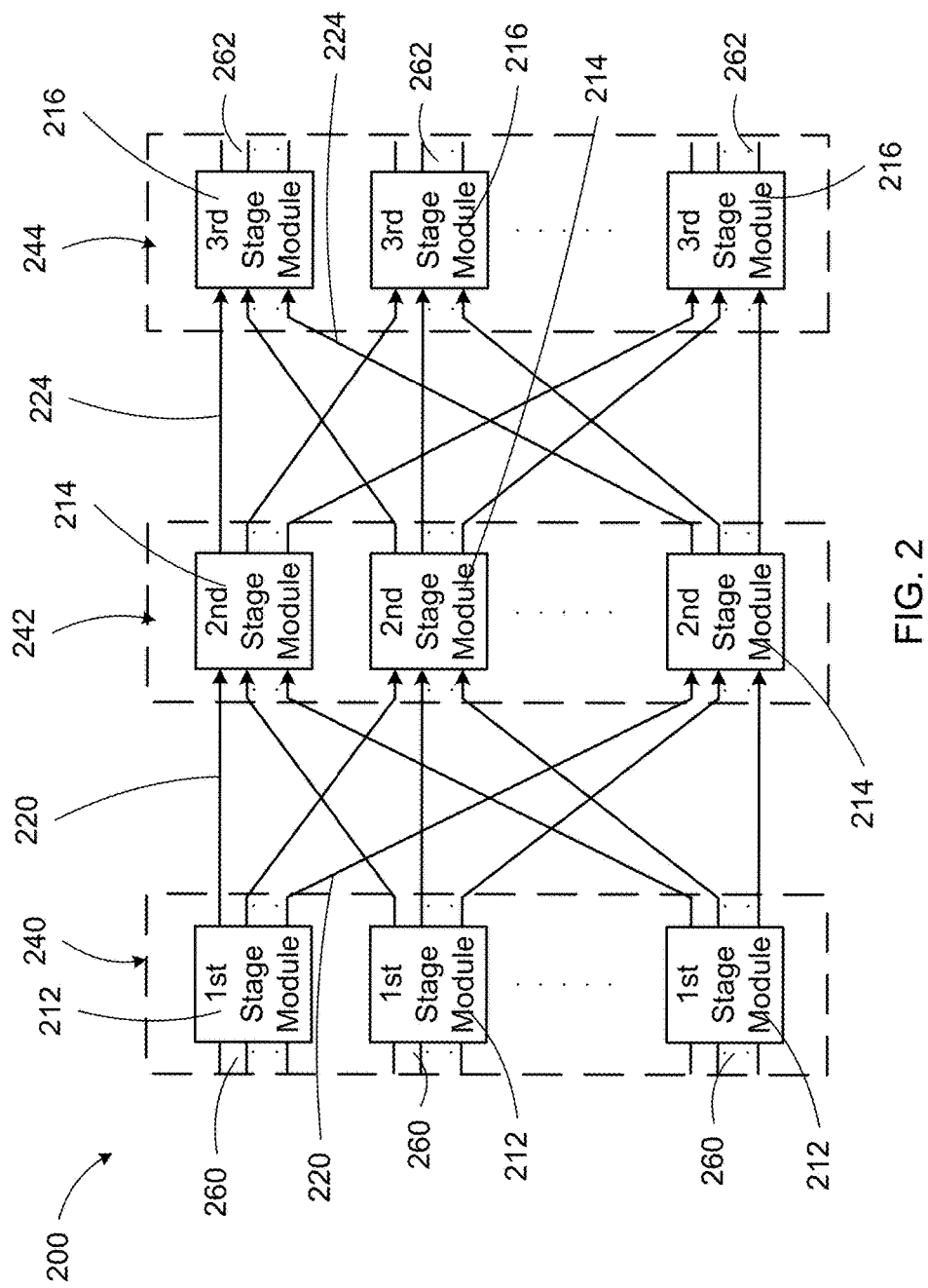
FIG. 2 is a schematic illustration of a multi-stage switch fabric, according to an embodiment.

FIG. 2 is a schematic illustration of a multi-stage switch fabric 200, according to an embodiment. The switch fabric 200 can be structurally and functionally similar to the switch fabric 110 shown and described with respect to FIG. 1. The switch fabric 200 can include multiple physical hops that are within a single logical hop. In some embodiments, the switch fabric 200 can be a multi-stage, non-blocking Clos network that includes a first stage 240, a second stage 242, and a third stage 244. The first stage 240 includes switch modules 212; the second stage 242 includes switch modules 214; the third stage 244 includes switch modules 216. Said another way, switch modules 212 of the first stage 240, switch modules 214 of the second stage 242 and switch modules 216 of the third stage 244 collectively define the multi-stage switch fabric 200.

In some embodiments, each switch module 212 of the first stage 240 can be an assembly of electronic components and circuitry. In some embodiments, for example, each switch module 212 is an ASIC. In other embodiments, multiple switch modules are contained on a single ASIC or a single chip package. In still other embodiments, each switch module is an assembly of discrete electrical components.

In some embodiments, each switch module 212 of the first stage 240 is a switch (e.g., a packet switch, a frame switch, an integrated Ethernet switch and/or a cell switch). The switches are configured to redirect data (e.g., data packets, data cells, etc.) as it flows through the switch fabric 200. In some embodiments, for example, each switch includes multiple ingress ports operatively coupled to write interfaces on a memory buffer (not shown in FIG. 2). Similarly, a set of egress ports are operatively coupled to read interfaces on the memory buffer. In some embodiments, the memory buffer can be a shared memory buffer implemented using on-chip static random access memory (SRAM) to provide sufficient bandwidth for all ingress ports to write one incoming data cell (e.g., a portion of a data packet) or data packet per time period (e.g., one or more clock cycles) and for all egress ports to read one outgoing data cell or data packet per time period. Each switch operates similarly to a crossbar switch that can be reconfigured in subsequent each time period.

Each switch module 212 of the first stage 240 includes a set of ingress ports 260 configured to receive data (e.g., a data cell, a data packet) as it enters the switch fabric 200. For example, each ingress port 260 can be coupled to an edge device (e.g., the edge devices 181-183 shown and described with respect to FIG. 1). In some embodiments, more than one ingress port 260 of a switch module 212 can be coupled to different ports of a common edge device via separate physical connections (e.g., multiple electrical cables, multiple fiber-optic cables, etc.). Accordingly, an edge device can send data to the switch fabric 200 via the ingress ports 260. In the embodiment of FIG. 2, each switch module 212 of the first stage 240 includes the same number of ingress ports 260. In other embodiments, each switch module 212 can have different numbers of ingress ports 260.

Similar to the first stage 240, the second stage 242 of the switch fabric 200 includes switch modules 214. The switch modules 214 of the second stage 242 are structurally similar to the switch modules 212 of the first stage 240. In some embodiments, each switch module 214 of the second stage 242 is operatively coupled to each switch module 212 of the first stage 240 by a data path 220. Each data path 220 between a given switch module 212 of the first stage 240 and a given switch module 214 of the second stage 242 is configured to facilitate data transfer from the switch modules 212 of the first stage 240 to the switch modules 214 of the second stage 242.

The data paths 220 between the switch modules 212 of the first stage 240 and the switch modules 214 of the second stage 242 can be constructed in any manner configured to facilitate data transfer from the switch modules 212 of the first stage 240 to the switch modules 214 of the second stage 242. In some embodiments, for example, the data paths 220 can be, for example, optical connectors between the switch modules. In other embodiments, the data paths 220 can be within a midplane. Such a midplane can be used to connect each switch module 214 of the second stage 242 with each switch module 212 of the first stage 240. In still other embodiments, two or more switch modules 212 and 214 can be contained within a single chip package and the data paths 220 can be electrical traces.

In some embodiments, the switch fabric 200 can be a non-blocking Clos network. Thus, the number of switch modules 214 of the second stage 242 of the switch fabric 200 varies based on the number of ingress ports 260 of each switch module 212 of the first stage 240. In a rearrangeably non-blocking Clos network (e.g., a Benes network), the number of switch modules 214 of the second stage 242 is greater than or equal to the number of ingress ports 260 of each switch module 212 of the first stage 240. In some embodiments, for example, each switch module 212 of the first stage 240 has five ingress ports. Thus, the second stage 242 has at least five switch modules 214. Each of the switch modules 212 of the first stage 240 is operatively coupled to all the switch modules 214 of the second stage 242 by data paths 220. Said another way, each switch module 212 of the first stage 240 can send data to any switch module 214 of the second stage 242.

The third stage 244 of the switch fabric 200 includes switch modules 216. The switch modules 216 of the third stage 244 are structurally similar to the switch modules 212 of the first stage 240. The number of switch modules 216 of the third stage 244 is typically equivalent to the number of switch modules 212 of the first stage 240. Each switch module 216 of the third stage 244 includes egress ports 262 configured to allow data to exit the switch fabric 200. For example, each egress port 262 can be coupled to an edge device (e.g., the edge devices 181-183 shown and described with respect to FIG. 1). In some embodiments, similar to the switch module 212 of the first stage 240, more than one egress port 262 of a switch module 216 can be coupled to different ports of a common edge device via separate physical connections (e.g., multiple electrical cables, multiple fiber-optic cables, etc.). Accordingly, the edge device can receive data from the switch fabric 200 via the egress ports 262. In the embodiment of FIG. 2, each switch module 216 of the third stage 244 includes the same number of egress ports 262. Further, the number of egress ports 262 of each switch module 216 of the third stage 244 is typically equivalent to the number of ingress ports 260 of each switch module 212 of the first stage 240. In other embodiments, each switch module 216 can have different numbers of egress ports 262, and the number of egress ports 262 of a switch module 216 of the third stage 244 can be different from the number of ingress ports 260 of a switch module 212 of the first stage 240.

In some embodiments, each switch module 216 of the third stage 244 can be connected to each switch module 214 of the second stage 242 by a data path 224. The data paths 224 between the switch modules 214 of the second stage 242 and the switch modules 216 of the third stage 244 are configured to facilitate data transfer from the switch modules 214 of the second stage 242 to the switch modules 216 of the third stage 244.

Similar to the data paths 220, the data paths 224 between the switch modules 214 of the second stage 242 and the switch modules 216 of the third stage 244 can be constructed in any manner configured to facilitate data transfer from the switch modules 214 of the second stage 242 to the switch modules 216 of the third stage 244. In some embodiments, for example, the data paths 224 can be, for example, optical connectors between the switch modules. In other embodiments, the data paths 224 can be within a midplane. Such a midplane can be used to connect each switch module 214 of the second stage 242 with each switch module 216 of the third stage 244. In still other embodiments, two or more switch modules 214 and 216 can be contained within a single chip package and the data paths 224 can be electrical traces.

In some embodiments, data can be routed through the switch fabric 200 using hash functions, lookup tables, routing tables and/or the like. For example, a first stage switch module 212 can determine to which second stage switch module 214 to send a data cell by using header values of the data cell as inputs to a hash function. A result of the hash function can be an identifier of a second stage switch module 214 and the first stage switch module 212 can send the data cell accordingly. Similarly, a second stage switch module 214 and/or a third stage switch module 216 can determine to which third stage switch module 216 or to which edge device (coupled to an egress port 262), respectively, to send the data cell, respectively, using such a hash function, a lookup table and/or a routing table.

Returning to FIG. 1, the management module 150 can be, for example, a process, application, virtual machine, and/or some other software module (store and/or executing in hardware) or a hardware module hosted at a device within the switch fabric system 100. In some embodiments, the management module 150 can be hosted at, for example, an edge device (e.g., the edge device 181-183), a switching device in the switch fabric 110, or any other suitable device in the switch fabric system 100. The device hosting the management module 150 is operatively coupled to the remaining devices of the switch fabric system 100, including the edge devices 181-183. For example, instructions that implement the management module 150 can be stored at a memory within an edge device (e.g., the edge devices 181-183) and executed at a processor of that edge device.

The management module 150 can be configured to manage one or more edge devices (e.g., the edge devices 181-183) of the switch fabric system 100. For example, the management module 150 can manage and/or maintain configuration information (e.g., port protocol information, network segment assignment information, port assignment information, peripheral processing device information, etc.), forwarding-state information (e.g., port identifiers, network segment identifiers, peripheral processing device identifiers, etc.), and/or other information associated with the edge devices 181-183. The management module 150 can also, for example, monitor a state and/or status of the peripheral processing devices (e.g., the peripheral processing devices 111-116) associated with the edge devices 181-183, and/or manage and maintain other information associated with the peripheral processing devices and/or ports associated with the edge devices 181-183. Particularly, the management module 150 can be configured to manage and maintain information associated with performing service(s) to data transmitted across the switch fabric system 100.

Figure 4:
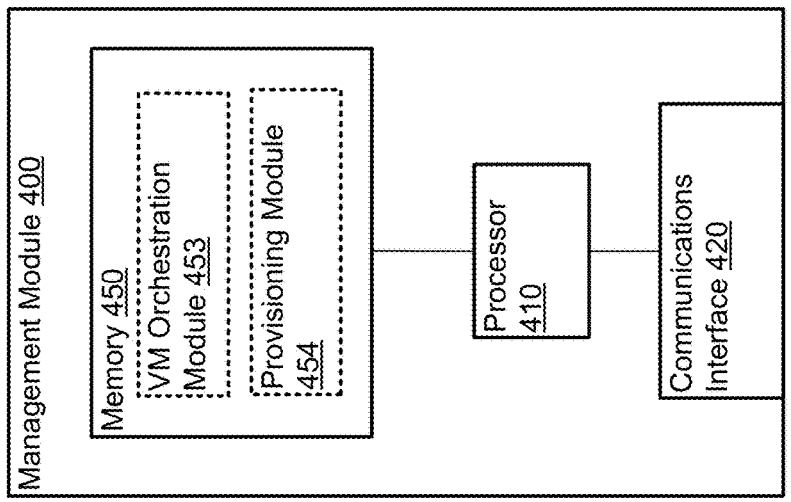
FIG. 4 is a block diagram of a management module, according to an embodiment.

FIG. 4 is a block diagram of a management module 400, according to an embodiment. The management module 400 can be structurally and functionally similar to the management module 150 shown and described with respect to FIG. 1. Particularly, the management module 400 can be hosted at a device (e.g., an edge device, a switching device) of a switch fabric system similar to the switch fabric system 100 in FIG. 1. The management module 400 can be operatively coupled to the remaining devices (e.g., edge devices) of the switch fabric system. In some embodiments, the management module 400 can be configured to manage operations of a set of edge devices in the switch fabric system.

As shown in FIG. 4, the management module 400 includes a memory 450, which includes a virtual machine (VM) orchestration module 453 and a provisioning module 454; a processor 410; and a communications interface 420. The memory 450 can be, for example, a RAM (e.g., a dynamic RAM, a static RAM), a flash memory and/or a removable memory. Each of the modules included in the memory 450 (include possible modules not shown in FIG. 4) can be, for example, a database, process, application, virtual machine, and/or some other software module (stored and/or executing in hardware) or a hardware module executed at the management module 400. Instructions that implement the modules can be stored in the memory 450 and executed by the processor 410. The processor 410 can be any processor configured to, for example, write data into and read data from the memory 450, and execute the instructions stored within the memory 450. The processor 410 can also be configured to control, for example, the operations of the VM orchestration module 453, the provisioning module 454, and the communications interface 420. Furthermore, by executing the instructions stored in the memory 450, the management module 400 can be configured to communicate with (e.g., transmit signals to and/or receive signals from) the devices (e.g., edge devices) managed by the management module 400 via the communications interface 420.

Under the control of the processor 410 and based on the instructions stored in the memory 450, the management module 400 can also, for example, manage operations of the set of edge devices in the switch fabric system. Particularly, the VM orchestration module 453, the provisioning module 454, and/or other modules (not shown in FIG. 4) of the management module 400 can be configured to collectively mange operations of the edge devices associated with performing service(s) on data transmitted across the switch fabric system.

The VM orchestration module 453 can be configured to manage (e.g., instantiate, configure, monitor, maintain, move, de-instantiate, etc.) virtual service modules executed at devices (e.g., service edge devices, service peripheral processing devices) in the switch fabric system. The virtual service modules managed by the VM orchestration module 453 can be executed to perform various services (e.g., security services, load balancing services) on data transmitted across the switch fabric system. For example, the VM orchestration module 453 can be configured to send a signal (e.g., via the communications interface 420) to an edge device such that a virtual service module is instantiated at that edge device. For another example, the VM orchestration module 453 can be configured to monitor a status of a virtual service module executed at a service peripheral processing device such that the VM orchestration module 453 can receive an indication (e.g., via the communications interface 420) from that service peripheral processing device indicating a change of status of that virtual service module (e.g., the virtual service module is overloaded).

The provisioning module 454 can be configured to maintain information associated with service modules that are available to perform service(s) and/or service modules that are actively performing service(s) on data transmitted across the switch fabric system. For example, the provisioning module 454 can be configured to maintain a data structure (e.g., a list, a table) storing information of available service(s) and location(s) of the associated service module(s) that performs the service(s). In some instances, the provisioning module 454 can be configured to send a copy of the data structure or a portion of the data structure to each edge device, such that the edge device can select an appropriate service module based on the data structure (details are further described with respect to FIG. 6). Furthermore, after a status of a service module is changed (e.g., activated, inactivated, overloaded, etc.), the provisioning module 454 can be configured to receive an indication of the change, update the information of that service module accordingly, and then send the updated information to each edge device. Thus, each edge device can be updated with any change of any service module in the switch fabric system.

Returning to FIG. 1, the switch fabric system 100 can be configured to forward data (e.g., data packets, data cells) generated from a source peripheral processing device to a destination peripheral processing device via an edge device coupled to the source peripheral processing device, the switch fabric 110, an edge device coupled to the destination peripheral processing device, and/or one or more devices (e.g., service edge devices, service peripheral processing devices) performing service(s) to the data. Thus, the switch fabric system 100 can be configured to perform one or more services to the data before the data is sent to the destination peripheral processing device.

For example, as shown in FIG. 1 and described in detail below, the switch fabric system 100 can be configured to forward data generated from the peripheral processing device 113 (functions as the source peripheral processing device) to the peripheral processing device 111 (functions as the destination peripheral processing device), via the edge device 181, the switch fabric 110, the edge device 182, and the edge device 183 and/or the peripheral processing device 115 (functions as the service edge device or the service peripheral processing device). Thus, one or more services can be performed on the data before the data is sent to the peripheral processing device 111. In this example, the data is sent from the peripheral processing device 113 to the peripheral processing device 111 via the data path 172 and the data path 174, as shown in FIG. 1.

Specifically, the edge device 181 can be configured to receive, for example, a portion of a data packet (e.g., a data cell, a data unit, the entire data packet, a header portion of the data packet, a payload portion of the data packet, etc.) from the peripheral processing device 113 via the data path 192. The edge device 181 can be referred to as a source edge device. The data packet can be associated with, for example, a first server (e.g., a web server, an application server) executed at the peripheral processing device 113 and a second server executed at the peripheral processing device 111. As a result, the data packet can be included in a stream of data packets that are generated at the first server at the peripheral processing device 113 and destined to the second server at the peripheral processing device 111.

The portion of the data packet can include, for example, routing information associated with the data packet such as, for example, a source address (e.g., an Internet Protocol (IP) address or a medium access control (MAC) address of the peripheral processing device 113), a destination address (e.g., an IP address or a MAC address of the peripheral processing device 111), an identifier of a service port (e.g., a port of the peripheral processing device 113 that is associated with the first server), an identifier of a destination port (e.g., a port of the peripheral processing device 111 that is associated with the second server), information associated with a transfer protocol, and/or the like. The portion of the data packet can include, for example, a header or a portion of a header of the data packet.

In response to receiving the portion of the data packet, the edge device 181 can be configured to identify a service to be performed on the portion of the data packet from, for example, a list of available services. Such a service can be, for example, a security service (e.g., firewall), a load balancing service (e.g., a service to distribute data packets over multiple data paths), or any other suitable service. In some embodiments, the edge device 181 can be configured to identify the service for the data packet based on, for example, the routing information of the data traffic (e.g., the source address, the destination address), the type of the data traffic (e.g., web server traffic, voice traffic), any other information associated with the data traffic (e.g., a transfer protocol), or any combination of the various information.

After a service is identified for the portion of the data packet, the edge device 181 can be configured to select a service module that can perform the identified service on the data from, for example, a set of service modules that can potentially perform the identified service. In some embodiments, such a service module can be executed at a service edge device, a service peripheral processing device, or any other type of device. In some embodiments, such a service module can be a virtual service module. The edge device 181 can then be configured to route the portion of the data packet to the selected service module, such that the identified service can be performed on the portion of the data packet at the service module.

For example, the edge device 181 can be configured to identify the service and select the service module to perform the identified service based on a destination address that is an address of the destination peripheral processing device (e.g., the peripheral processing device 111). For another example, the edge device 181 can be configured to identify the service and select the service module to perform the identified service based on a destination address that is an address of a destination edge device (e.g., the edge device 182), which operatively couples the destination peripheral processing device to the switch fabric 110. In such an instance, the edge device 181 can be configured to determine the address of the destination edge device based on the address of the destination peripheral processing device using, for example, a routing table. Similarly, the source address used to identify the service and select the service module at the edge device 181 can be an address of the source peripheral processing device (e.g., the peripheral processing device 113) or an address of the source edge device (e.g., the edge device 181).

Figure 6:
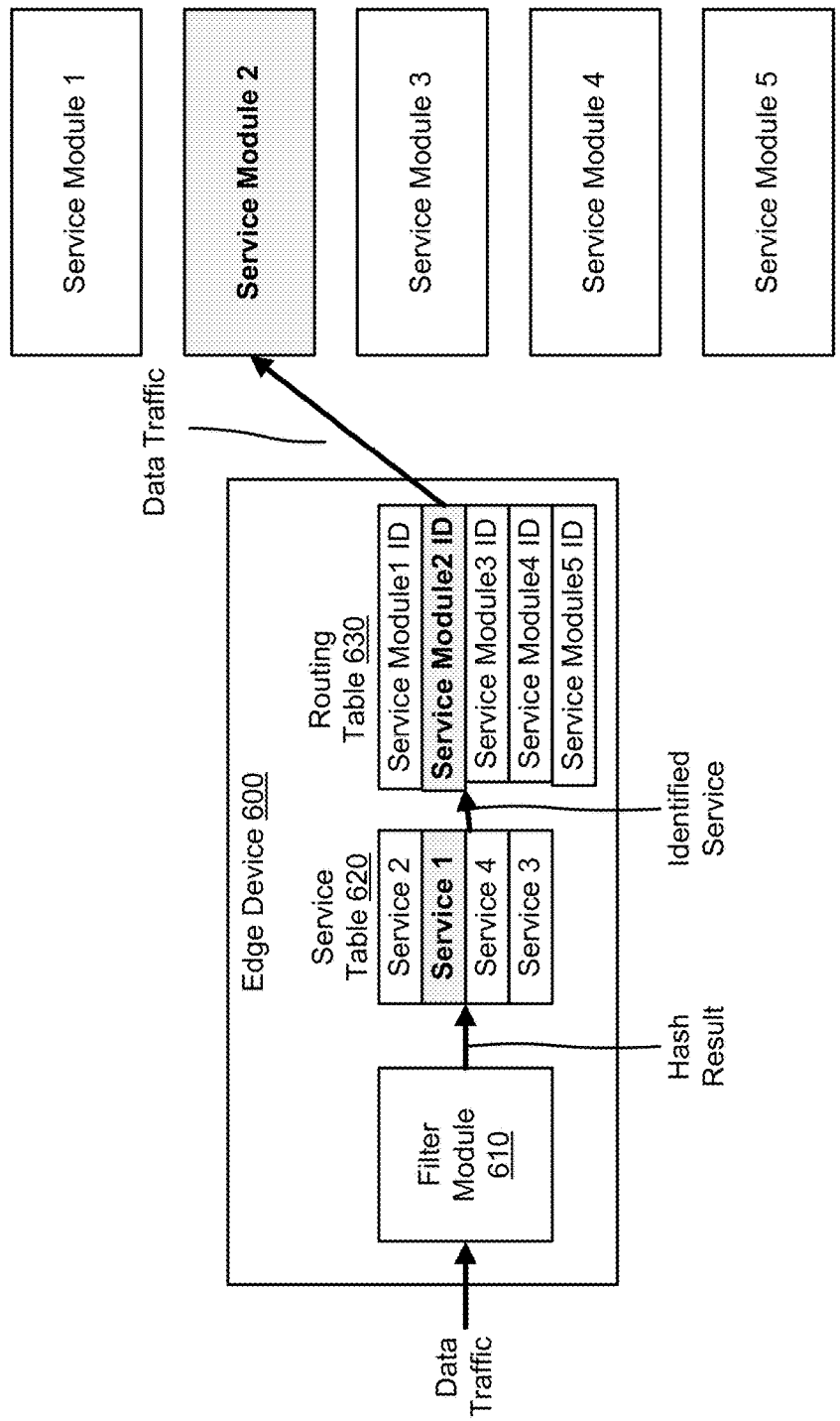
FIG. 6 is a schematic illustration of an edge device configured to route data traffic to service edge devices, according to an embodiment.

FIG. 6 is a schematic illustration of an edge device 600 configured to route data traffic to service edge devices (e.g., edge devices hosting the service modules 1-5), according to an embodiment. The edge device 600 can be structurally and functionally similar to the edge devices 181-183 and the edge device 300 shown and described with respect to FIGS. 1 and 3, respectively. Similar to the edge device 300, the edge device 600 includes a filter module 610, a service table 620 and a routing table 630. The service table 620 and the routing table 630 can be stored and maintained in, for example, a memory of the edge device 600 (not shown in FIG. 6, but similar to the memory 350 of the edge device 300 in FIG. 3). Instructions that implement the filter module 610 can be stored in a memory of the edge device 600 and executed at a processor of the edge device 600 (not shown in FIG. 6, but similar to the processor 330 of the edge device 300 in FIG. 3).

Similar to the edge devices 181-183 in FIG. 1, the edge device 600 can be included in a switch fabric system (not shown in FIG. 6) that is similar to the switch fabric system 100 in FIG. 1. Specifically, the edge device 600 can be operatively coupled to a source peripheral processing device (similar to the peripheral processing devices 111-116 in FIG. 1, not shown in FIG. 6) and a switch fabric (similar to the switch fabric 110 in FIG. 1, not shown in FIG. 6). Furthermore, the edge device 600 can be operatively coupled to a set of service modules 1-5 that can perform services 1-4 on data transmitted across the switch fabric system. Each service module 1-5 can perform one or more services 1-4. For example, the service module 1 performs the service 1 and the service 2. For another example, the service 3 is performed by the service modules 2, 4 and 5. The service modules 1-5 can be hosted and executed at, for example, service edge devices, service peripheral processing devices, and/or any other devices associated with the switch fabric system. Additionally, information (e.g., identifiers) associated with the services 1-4 is stored and maintained in the service table 620, and information (e.g., identifiers) associated with the service modules 1-5 is stored and maintained in the routing table 630. In some embodiments, the service table 620 and the routing table 630 can be maintained by, for example, a management module (similar to the management module 150 in FIG. 1) associated with the switch fabric system.

As shown in FIG. 6, the edge device 600 can be configured to receive data (e.g., a data packet, a portion of a data packet) associated with a data stream from, for example, the source peripheral processing device operatively coupled to the edge device 600. The data stream can be generated at the source peripheral processing device and destined to a destination peripheral processing device. In some embodiments, the data received at the edge device 600 can include routing information (e.g., a source address, a destination address), and/or any other information of the data stream (e.g., the type of the data traffic, the transfer protocol).

In response to receiving the data, the filter module 610 can be configured to identify a service, from the set of services 1-4, to be performed on the data. The services 1-4 can include, for example, a security service (e.g., firewall), a load balancing service (e.g., distribute data over multiple data paths), and/or any other suitable service. In some embodiments, the filter module 610 can be configured to identify the service based on the information associated with the data stream that is included in the data received at the edge device 600. For example, as shown in FIG. 6, the filter module 610 can be configured to identify the service 1, which is a firewall service, based on the data stream being associated with web server traffic. For another example, the filter module 610 can be configured to identify the service 2, which is a load balancing service, based on the destination peripheral processing device associated with the data stream. In some embodiments, the filter module 610 can be configured to identify the service based at least in part on, for example, a five-tuple (a source address, a destination address, a transfer protocol, a service port, a destination port) associated with the data stream.

In some instances, the filter module 610 can implement a hash function to identify the service for the data received at the edge device 600. In such instances, information associated with the data stream such as the destination address can be used as an input to the hash function. The result of the hash function can be used to identify one of the services 1-4. For example, the result of the hash function can be associated with or uniquely mapped to an identifier of a service that is stored in an entry of the service table 620. The service associated with that identifier can then be identified as the service to be performed on the data. In other embodiments, the filter module 610 can implement any other suitable method such as, for example, a mapping table, to identify a service for the received data.

After a service is identified, the edge device 600 can be configured to select a service module, from the set of service modules 1-5, to perform the identified service on the data. For example, the edge device 600 can be configured to select the service module based on the identified service. For example, the service modules 1 and 2 can perform the service 1, which is a firewall service, on data. Thus, based on the identified service being the service 1, the edge device 600 can select, using a suitable method, the service module 2 to perform the service 1 on the data, as shown in FIG. 6. For another example, the service modules 3 and 5 can perform the service 2, which is a load balancing service, on data. Thus, based on the identified service being the service 2, the edge device 600 can select, using a suitable method, the service module 5 to perform the service 2 on the data.

In some embodiments, the edge device 600 can be configured to select the service module for the data based on information other than the identified service, such as information associated with the data packet, information associated with the service modules, and/or the like. For example, the edge device 600 can be configured to select the service module for the data based on a source address and/or a destination address of the data stream, such that the selected service module is physically close to the source edge device and/or the destination edge device. For another example, the edge device 600 can be configured to select the service module for the data based on a status of each service module, such that a service module that is currently busy with performing a service to another data stream is not selected. In some embodiments, the edge device 600 can be configured to select the service module for the data based at least in part on, for example, the five-tuple (a source address, a destination address, a transfer protocol, a service port, a destination port) associated with the data stream.

Additionally, in some embodiments, the edge device 600 can be configured to select the service module for the data based on some varying factor such that the service module can be selected in a randomized fashion. For example, the edge device 600 can be configured to select a service module, from a set of service modules that perform a specific service, for a data packet that uses the specific service based on a timestamp that records the time when that data packet is received at the edge device. For another example, the edge device 600 can be configured to select a service module, from a set of service modules that perform a specific service, for a data packet that uses the specific service based on a number that is randomly generated for that data packet. In the above two examples, as a result, the service module selected for a data packet of a data stream can be different from the service module selected for another data packet of the same data stream. For example, a firewall service (e.g., the service 1) is identified to be performed on a data stream of packets. The edge device 600 is configured to select a service module, from the set of service modules (e.g., the service modules 1, 2, 3 and 4) that perform the firewall service, for each data packet from the data stream based on a random number included in that data packet. As a result, the service module 2 is selected to perform the firewall service on a data packet from the data stream (as shown in FIG. 6); while the service module 3 is selected to perform the firewall service on another data packet form the data stream.

In some embodiments, the edge device 600 can implement a hash function to select a service module for the data based on the identified service. In such embodiments, an identifier of the identified service, information associated with the data stream (e.g., the destination address), and/or other suitable information (e.g., a timestamp) can be used as inputs to the hash function. The result of the hash function can be used to select a service module from the set of service modules that can perform the identified service from the service modules 1-5. For example, the result of the hash function can be associated with or uniquely mapped to a service module identifier that is stored in an entry of the routing table 630. The service module associated with that service module identifier can then be selected as the service module to perform the identified service on the data. In other embodiments, the edge device 600 can implement any other suitable method such as, for example, a round-robin mechanism, to select a service module, from the set of service modules that can perform the identified service, to perform the identified service on the received data.

In some embodiments, the selected service module can be hosted and executed at a service edge device, a service peripheral processing device, or any other device associated with the switch fabric system. In some embodiments, the selected service module can be different from the source peripheral processing device, the destination peripheral processing device, the edge device 600 (as the source edge device), and the destination edge device. In other embodiments, the selected service module can be hosted an executed at, for example, the edge device 600 (as the source edge device), the destination edge device, or the destination peripheral processing device.

After a service module is selected at the edge device 600, the edge device 600 can be configured to send the data to the selected service module via the switch fabric. As a result, the selected service module can perform the identified service on the data. For example, as shown in FIG. 6, after the service module 2 is selected at the edge device 600 to perform the service 1 on the data received at the edge device 600, the edge device 600 is configured to send the data to the service module 2. As a result, the service module 2 can perform the service 1 on the data.

In some instances, when a service module is hosted and executed at a service peripheral processing device, the edge device 600 can be configured to select an edge device coupled to that service peripheral processing device. For example, an identifier of that edge device can be stored in the routing table 630 and selected based on an identified service that is to be performed on the data at the service peripheral processing device. As a result, the edge device 600 sends the data to the selected edge device, which is then configured to forward the data to the service peripheral processing device. Alternatively, in other instances, the edge device 600 can be configured to select the service peripheral processing device to perform the identified service. For example, an identifier of that service peripheral processing device can be stored in the routing table 630 and selected based on the identified service that is to be performed on the data at the service peripheral processing device. In such embodiments, the edge device 300 can be configured to determine the edge device coupled to the service peripheral processing device, and send the data to that edge device accordingly. Similarly, that edge device can be configured to forward the data to the service peripheral processing device.

Returning to FIG. 1, in the example previously described and shown in FIG. 1, the edge device 181 is configured to identify a service to be performed on the portion of the data packet (e.g., a data cell, a data unit, the entire data packet, a header portion of the data packet, a payload portion of the data packet, etc.) received from the peripheral processing device 113. The edge device 181 is further configured to select a service module hosted and executed at the peripheral processing device 115 to perform the identified service on the portion of the data packet. Thus, the edge device 181 is configured to send the portion of the data packet to the peripheral processing device 115 via the data path 172. Specifically, as shown in FIG. 1, the portion of the data packet is sent from the edge device 181 into the switch fabric 110 (e.g., to an ingress port of the switch fabric 110) via the data path 193. The portion of the data is forwarded across the switch fabric 110 and sent (e.g., from an egress port of the switch fabric 110) to the edge device 183 via the data path 194, and then forwarded from the edge device 183 to the peripheral processing device 115 via the data path 195. As a result, the identified service is performed on the portion of the data packet at the peripheral processing device 115.

After the peripheral processing device 115 performs the identified service on the portion of the data packet, the peripheral processing device 115 can be configured to send the portion of the data packet to the peripheral processing device 111 via the edge device 183, the switch fabric 110 and the edge device 182, shown as the data path 174 in FIG. 1. Thus, the identified service is performed on the portion of the data packet before the portion of the data packet is sent to the destination peripheral processing device.

In some embodiments, the edge device can be configured to select a service module, which is hosted and executed at a service edge device to perform the identified service on the portion of the data packet. In such embodiments, the edge device is configured to send the portion of the data packet to the service edge device. As a result, the identified service is performed on the portion of the data packet at the service edge device. Furthermore, after performing the identified service, the service edge device is configured to send the portion of the data packet to the destination peripheral processing device (e.g., via the switch fabric and the destination edge device). Thus, the identified service is performed on the portion of the data packet before the portion of the data packet is sent to the destination peripheral processing device.

In some instances, the edge device 181 can be configured to determine that no service is to be performed on the data received from the peripheral processing device 113 and destined to the peripheral processing device 111. In such instances, the edge device 181 can be configured to send the data to the peripheral processing device 111 via the switch fabric 110 and the edge device 182 without passing through a service module (e.g., at a service edge device or a service peripheral processing device).

In some embodiments, more than one service can be performed on data transmitted across the switch fabric system 100 before the data is sent from a source peripheral processing device to a destination peripheral processing device. In some embodiments, similar to the edge device 600 shown and described with respect to FIG. 6, a source edge device can be configured to identify multiple services to be performed on data received at the source edge device from the source peripheral processing devices. The source edge device can further select a service module to perform each of the multiple services. The source edge device can be configured to send the data to a first selected service module such that the first selected service module performs a first identified service associated with the first selected service module on the data, and then sends the data to a second selected service module. Thus, in such a sequential method, the data is sent to each of the selected service modules, which performs the associated identified service on the data in turn. Ultimately, each of the identified services is performed on the data and the data is sent to the destination peripheral processing device.

In some embodiments, for example, in response to receiving a data stream of data packets from a source peripheral processing device, the source edge device can be configured to encapsulate information associated with the selected service modules and/or the identified services in a first data packet (e.g., in a header of the first data packet) from the data stream, and then send the first data packet to the first selected service module. In response to receiving the first data packet, a first edge device hosting the first selected service module or operatively coupled to the first selected service module can be configured to decapsulate the first data packet to obtain the information associated with the service to be performed at the first selected service module. The first selected service module can perform the service on the data included in the first data packet accordingly. The first edge device further obtains the information associated with the remaining selected service module(s) and/or the remaining identified service(s) from the first data packet. Similar to the source edge device, the first edge device can be configured to encapsulate information associated with the remaining selected service module(s) and/or the remaining identified service(s) in a second data packet (e.g., in a header of the second data packet), and then send the second data packet to a second selected service module. In such a sequential method, the data is sent to each selected service module in turn, which performs the identified service associated with that selected service module on the data accordingly.

In other embodiments, the multiple services can be identified and/or performed on the data in any other suitable method. For example, the source edge device can identify a first service to be performed on the data received at the source edge device from the source peripheral processing devices. The source edge device is configured to select a first service module to perform the first identified service, and send the data to the first selected service module accordingly. Once received, the first service module can perform the first identified service on the data. Then, similar to the source edge device, an edge device hosting the first selected service module or operatively coupled to the first selected service module can identify a second service to be performed on the data, and select a second service module to perform the second identified service. Accordingly, that edge device can send the data to the second selected service module. Thus, in such a sequential method, the data is sent to each service module that is selected at an edge device associated with the previous service module in the sequence. Each selected service module can perform the identified service associated with that selected service module and then forward the data accordingly. The last selected service module can send the data to the destination edge device.

In other embodiments, the first service module can perform the first identified service on the data. After performing the first identified service on the data, the first service module can return the data to the source edge device. The source edge device can then send the data to a second service module to perform a second identified service on the data. After performing the second identified service on the data, the second service module can return the data to the source edge device. After the identified services have been performed on the data, the source edge device can send the data to the destination edge device. In such a manner, the source service module can act as a hub or a coordinator of the service modules.

Figure 7:
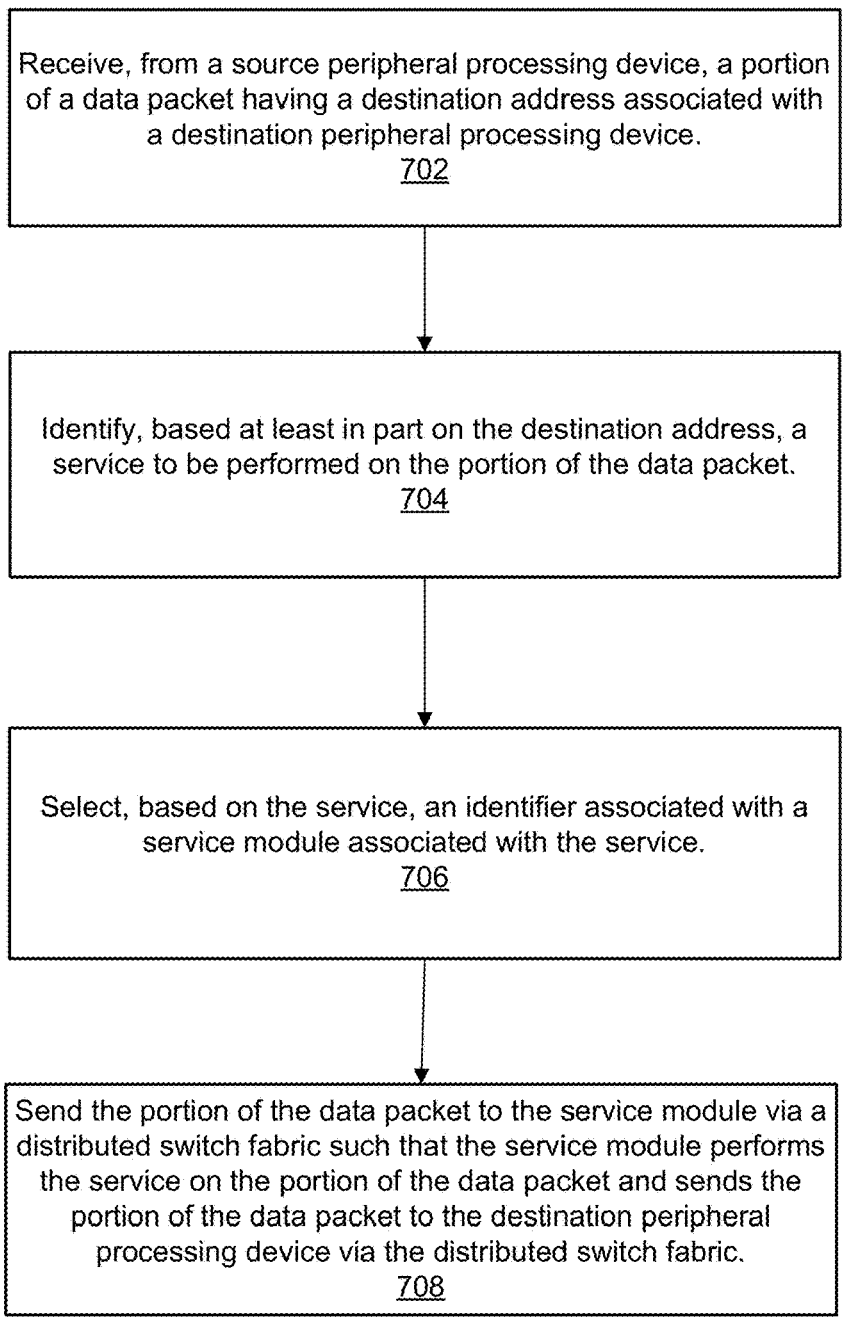
FIG. 7 is a flow chart illustrating a method of performing a service on data transmitted across a distributed switch fabric, according to an embodiment.

FIG. 7 is a flow chart illustrating a method 700 of performing a service on data transmitted across a distributed switch fabric, according to an embodiment. The method 700 can be performed at an edge device that is structurally and functionally similar to the edge devices 181-183 and the edge device 300 shown and described with respect to FIGS. 1 and 3, respectively. Particularly, instructions associated with performing the method 700 can be stored within a non-transitory processor-readable medium in a memory of the edge device (e.g., the memory 350 of the edge device 300 in FIG. 3). The non-transitory processor-readable medium stores code representing instructions (including the instructions associated with performing the method 700) to be executed by a processor of the edge device (e.g., the processor 330 of the edge device 300 in FIG. 3). Furthermore, similar to the edge devices 181-183 in FIG. 1, the edge device performing the method 700 can be associated with a distributed switch fabric (e.g., the switch fabric 110 in FIG. 1) and operatively coupled to one or more peripheral processing devices (e.g., the peripheral processing devices 111-116 in FIG. 1).

The method 700 includes receiving, from a source peripheral processing device, a portion of a data packet (e.g., a data cell, a data unit, the entire data packet, a header portion of the data packet, a payload portion of the data packet, etc.) having a destination address associated with a destination peripheral processing device, at 702. The source peripheral processing device is operatively coupled to the edge device. The data packet can be included in a data stream that is generated at the source peripheral processing device and destined to the destination peripheral processing device. In some embodiments, the portion of the data packet can include, for example, a header of the data packet.

In the example of FIG. 1, the edge device 181 can receive a portion of a data packet (e.g., a data cell, a data unit, the entire data packet, a header portion of the data packet, a payload portion of the data packet, etc.) from the peripheral processing device 113 via the data path 192. The data packet can, for example, be included in a data stream of web server traffic that is generated at a web server executed at the peripheral processing device 113 and destined to an application server executed at the peripheral processing device 111. The portion of the data packet can include a header of the data packet, which includes an address (e.g., an IP address, a MAC address) of the peripheral processing device 111 as a destination address.

At 704, the edge device can be configured to identify a service to be performed on the portion of the data packet (e.g., a data cell, a data unit, the entire data packet, a header portion of the data packet, a payload portion of the data packet, etc.). In some embodiments, the service can be, for example, a security service, a load balancing service, or any other suitable service. In some embodiments, the edge device can be configured to identify the service based on the destination address, and/or any other information associated with the data packet (e.g., routing information, type of the data traffic, transfer protocol, etc.). In some embodiments, as described above with respect to FIG. 6, the edge device can be configured to identify the service using, for example, a hash function. In such embodiments, the destination address and/or other information associated with the data packet can be used as an input to the hash function, and the result of the hash function can be used to identify the service to be performed on the portion of the data packet. In some embodiments, the edge device can be configured to determine a destination edge device that is operatively coupled to the destination peripheral processing device, and identify the service based on an address (e.g., an IP address, a MAC address) of the destination edge device (e.g., use the address of the destination edge device as an input to the hash function).

In the example of FIG. 1, the edge device 181 can be configured to identify a firewall service to be performed on the portion of the data packet received from the peripheral processing device 113. The edge device 181 can be configured to identify the firewall service for the portion of the data packet based on a destination address (e.g., the address of the peripheral processing device 111, the address of the edge device 182), the type of the data traffic (i.e., web server traffic), and/or other information associated with the data packet.

At 706, the edge device can be configured to select, based on the service, an identifier associated with a service module associated with the service, at 706. In some embodiments, the selected service module can be hosted and executed at, for example, a service edge device, a service peripheral processing device, or any other device associated with the distributed switch fabric. The service edge device can be different from the edge device and the destination edge device. Similarly, the service peripheral processing device can be different from the source peripheral processing device and the destination peripheral processing device. In some embodiments, as described above with respect to FIG. 6, the edge device can be configured to select the identifier of the service module using, for example, a hash function. In such embodiments, the identified service, the destination address and/or other information (e.g., information associated with the data packet, information associated with the service modules, information associated with the identified service) can be used as inputs to the hash function, and the result of the hash function can be used to select the identifier of the service module.

In the example of FIG. 1, the edge device 181 can be configured to select a service module, which is executed at the peripheral processing device 115, to perform the identified firewall service on the portion of the data packet (e.g., a data cell, a data unit, the entire data packet, a header portion of the data packet, a payload portion of the data packet, etc.). The edge device 181 can be configured to select an identifier of the service module based on the firewall service, the destination address (e.g., the address of the peripheral processing device 111, the address of the edge device 182), a status of each service module that can perform the firewall service, and/or any other suitable information.

At 708, the edge device can be configured to send the portion of the data packet to the selected service module via the distributed switch fabric such that the service module performs the service on the portion of the data packet and sends the portion of the data packet to the destination peripheral processing device via the distributed switch fabric.

In the example of FIG. 1, the edge device 181 can be configured to send the portion of the data packet to the service module at the peripheral processing device 115, which is selected to perform the firewall service on the portion of the data packet. As shown in FIG. 1, the portion of the data packet is sent from the edge device 181 to the peripheral processing device 115 via the data path 193, the switch fabric 110, the data path 194, the edge device 183 and the data path 195. As a result, the selected service module performs the firewall service on the portion of the data packet at the peripheral processing device 115. The peripheral processing device is then configured to send the portion of the data packet to the peripheral processing device 111 via the edge device 183, the switch fabric 110 and the edge device 182, shown as the data path 174 in FIG. 1. Ultimately, the portion of the data packet is sent to the application server at the peripheral processing device 111.

In some embodiments, the service identified to be performed on the portion of the data packet at 704 is a first service, and the service module selected at 706 to perform the first service is a first service module. The edge device can be configured to identify a second service to be performed on the portion of the data packet, where the second service is different from the first service. Based on the second device, the edge device can be configured to select an identifier associated with a second service module associated with the second service, where the second service module is different from the first service module. As a result, the edge device can be configured to send the portion of the data packet to the first service module via the distributed switch fabric such that the first service and the second service are performed on the portion of the data packet at the first service module and the second service module, respectively, before the portion of the data packet is sent to the destination peripheral processing device. Similarly, such a process can be operated for any number of services and service modules. That is, any number of services can be performed on a data packet (or a portion of a data packet) at one or more service modules before the data packet is sent to the destination peripheral processing device.

In the example of FIG. 1, the edge device 181 can be configured to identify a firewall service and a load balancing service to be performed on the portion of the data packet received from the peripheral processing device 113. The edge device 181 can be configured to select a service module executed at the peripheral processing device 115 to perform the identified firewall service, and a service module executed at the peripheral processing device 112 to perform the identified load balancing service. The edge device 181 can be configured to send the portion of the data packet, along with information associated with the identified services and the selected service modules, to the peripheral processing device 115 (e.g., via the switch fabric 110 and the edge device 183). As a result, the peripheral processing device 115 performs the identified firewall service on the portion of the data, and then sends the portion of the data packet to the peripheral processing device 112 (e.g., via the edge device 183, the switch fabric 110 and the edge device 182), where the identified load balancing service is performed. Ultimately, the portion of the data packet is sent from the peripheral processing device 112 to the peripheral processing device 111 (e.g., via the edge device 182).

Although some embodiments are shown and described above with respect to FIGS. 1-7 as including edge devices capable of identifying services and selecting service modules for data transmitted across a switch fabric, it should be understood that other embodiments are possible. In some embodiments, for example, a peripheral processing device can be capable of performing at least a portion of identifying services and selecting service modules. For example, a peripheral processing device can be configured to identify services and an edge device coupled to that peripheral processing device can be configured to select service modules for the identified services. In some embodiments, for example, peripheral processing devices capable of identifying services and selecting service modules can be interconnected by a multi-path network having multiple switch nodes without any edge device.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code. Such computer code can also be referred to as a computer program and some embodiments can be in the form of a computer program.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A non-transitory processor-readable medium storing code representing instructions to be executed by a processor, the code comprising code to cause the processor to:
receive, from a source peripheral processing device, a portion of a data packet having a destination address associated with a destination peripheral processing device;
identify, based at least in part on the destination address and a data traffic type, a service to be performed on the portion of the data packet, the data traffic type being one of a web traffic type or a voice traffic type;
generate a timestamp of the portion of the data packet based on a time at which the portion of the data packet was received from the source peripheral processing device;
based on the service and the timestamp, and prior to sending the portion of the data packet to any service module from a set of service modules, select a service module from the set of service modules based on at least one of (1) selecting an identifier of the service module, the identifier being selected based on a result of a hash function having the destination address as an input to the hash function, (2) a physical proximity of the service module to one of (a) the source peripheral processing device, or (b) the destination peripheral processing device, or (3) a status of the service module; and
based on the selection of the service module, send the portion of the data packet to the service module via a distributed switch fabric such that the service module performs the service on the portion of the data packet and sends the portion of the data packet to the destination peripheral processing device via the distributed switch fabric.

2. The non-transitory processor-readable medium of claim 1, wherein the service module is within one of an edge device or a service peripheral processing device different from the source peripheral processing device and the destination peripheral processing device.

3. The non-transitory processor-readable medium of claim 1, wherein the service module is a first service module, the service is a first service, the code further comprising code to cause the processor to:
identify a second service to be performed on the portion of the data packet; and
select, based on the second service, an identifier associated with a second service module associated with the second service, the code to cause the processor to send includes code to cause the processor to send the portion of the data packet to the first service module via the distributed switch fabric such that the first service module performs the first service on the portion of the data packet and sends the portion of the data packet to the destination peripheral processing device via the distributed switch fabric and the second service module.

4. An apparatus, comprising:
an edge device configured to receive, from a first peripheral processing device, data to be sent to a second peripheral processing device via a distributed switch fabric, the edge device configured to determine a service to be provided to the data based on a data traffic type associated with the data, the edge device configured to select, prior to sending the data to any service module from a set of service modules, a virtual service module from the set of service modules to perform the service on the data, the data traffic type being one of a web traffic type or a voice traffic type, the edge device configured to send the data to the virtual service module to perform the service on the data via the distributed switch fabric such that the virtual service module performs the service on the data and sends the data to the second peripheral processing device via the distributed switch fabric.

5. The apparatus of claim 4, wherein the edge device is a first edge device, the first edge device configured to select based on a hash function a second edge device directly coupled to the virtual service module, the first edge device configured to send the data to the virtual service module via the distributed switch fabric and the second edge device.

6. The apparatus of claim 4, wherein the service is a first service, the edge device is a first edge device, the first edge device configured to send the data to the virtual service module associated with the first service such that the virtual service module associated with the first service performs the first service on the data and sends the data to the second peripheral processing device via a service module associated with a second service and via the distributed switch.

7. The apparatus of claim 4, wherein the edge device is a first edge device, the first edge device configured to select a second edge device directly coupled to the virtual service module based on at least one of an address associated with the first peripheral processing device or an address associated with the second peripheral processing device, the first edge device configured to send the data to the virtual service module via the distributed switch fabric and the second edge device.

8. The apparatus of claim 4, wherein the data is first data, the edge device configured to receive, from a third peripheral processing device, second data to be sent to a fourth peripheral processing device via the distributed switch fabric, the edge device configured to determine that a service is not to be provided to the second data, the edge device configured to send the second data to the fourth peripheral processing device via the distributed switch and without passing through a service module.

9. An apparatus, comprising:
a service module implemented in an edge device associated with a distributed switch fabric, the service module configured to receive a portion of a data packet from a source edge device different from the edge device associated with the distributed switch fabric and via the distributed switch fabric based at least on a data traffic type of the data packet, the service module being selected, based at least in part on a timestamp of the data packet and before any remaining service module within the distributed switch fabric both (1) is selected to receive the portion of the data packet, and (2) receives the portion of the data packet, to receive the portion of the data packet and to perform at least one of a security service or a load balancing service on the portion of the data packet, the timestamp indicating a time at which the portion of the data packet was received from the source peripheral processing device, the service module configured to perform at least one of the security service or the load balancing service, the service module configured to send the portion of the data packet to a destination edge device via the distributed switch fabric after performing the at least one of the security service or the load balancing service on the portion of the data packet, the service module being (1) from a plurality of service modules configured to perform the at least one of the security service or the load balancing service, and (2) selected by the source edge device based at least in part on an address associated with the destination edge device.

10. The apparatus of claim 9, wherein the service module is a first service module, the service is a first service,
the first service module configured to identify a second service module configured to perform a second service on the portion of the data packet, the first service module configured to send the portion of the data packet to the destination edge device via the distributed switch fabric and the second service module.

11. The apparatus of claim 9, wherein the service module is a virtual service module.

12. The non-transitory processor-readable medium of claim 1, wherein the code to cause the processor to select includes code to cause the processor to:
apply a hash function to the destination address;
select an identifier of the service module from a service table based on a result of applying the hash function, and
further select the service module, in part, based on the identifier of the service module.

13. The non-transitory processor-readable medium of claim 1, wherein the code to cause the processor to select includes code to cause the processor to further select the service module based in part on an identifier of the service module, the identifier being determined in part based on a randomly-generated number.

* * * * *